US010545309B2

(12) United States Patent
Terada et al.

(10) Patent No.: US 10,545,309 B2
(45) Date of Patent: Jan. 28, 2020

(54) SOLID IMMERSION LENS HOLDER AND IMAGE ACQUISITION DEVICE

(71) Applicant: HAMAMATSU PHOTONICS K.K., Hamamatsu-shi, Shizuoka (JP)

(72) Inventors: Hirotoshi Terada, Hamamatsu (JP); Ikuo Arata, Hamamatsu (JP); Masataka Ikesu, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/507,252

(22) PCT Filed: Sep. 24, 2015

(86) PCT No.: PCT/JP2015/076881
§ 371 (c)(1),
(2) Date: Feb. 28, 2017

(87) PCT Pub. No.: WO2016/047667
PCT Pub. Date: Mar. 31, 2016

(65) Prior Publication Data
US 2017/0285296 A1 Oct. 5, 2017

(30) Foreign Application Priority Data

Sep. 26, 2014 (JP) ................................. 2014-197008

(51) Int. Cl.
*G02B 7/02* (2006.01)
*G02B 7/16* (2006.01)
(Continued)

(52) U.S. Cl.
CPC ............... *G02B 7/027* (2013.01); *G02B 7/02* (2013.01); *G02B 7/16* (2013.01); *G02B 21/0052* (2013.01);
(Continued)

(58) Field of Classification Search
CPC .... G02B 21/33; G02B 21/02; G02B 21/0016; G02B 21/248; G02B 7/02; G02B 7/022;
(Continued)

(56) References Cited

U.S. PATENT DOCUMENTS 4,281,895 A 8/1981 Mohr
5,125,750 A 6/1992 Code et al.
(Continued)

FOREIGN PATENT DOCUMENTS

CN 1770285 A 5/2006
CN 1875306 A 12/2006
(Continued)

OTHER PUBLICATIONS

English-language translation of International Preliminary Report on Patentability (IPRP) dated Apr. 6, 2017 that issued in WO Patent Application No. PCT/JP2015/076880.
(Continued)

*Primary Examiner* — Brandi N Thomas
(74) *Attorney, Agent, or Firm* — Drinker Biddle & Reath LLP

(57) ABSTRACT

A solid immersion lens holder includes a first member having a first opening disposing a spherical face portion therein so that a part of the spherical face portion protrudes toward an objective lens side and a second member having a second opening disposing a contact portion therein so that a contact face protrudes toward a side opposite to the objective lens side. The first member includes three plate members disposed on the objective lens side with respect to the first opening. Each of the three plate members is provided with a protrusion portion capable of contacting the spherical face portion.

8 Claims, 6 Drawing Sheets

(51) Int. Cl.
*G02B 21/00* (2006.01)
*G02B 21/02* (2006.01)
*G02B 21/26* (2006.01)
*G02B 21/33* (2006.01)
*G02B 21/36* (2006.01)

(52) U.S. Cl.
CPC ............. *G02B 21/02* (2013.01); *G02B 21/26* (2013.01); *G02B 21/33* (2013.01); *G02B 21/361* (2013.01); *G02B 21/362* (2013.01)

(58) Field of Classification Search
CPC ........ G02B 7/16; G02B 21/362; G02B 21/26; G02B 21/361; G02B 21/0052; G02B 21/36; G02B 27/32; G02B 7/14; G02B 21/00; G02B 7/027
USPC .................... 359/811, 813, 815, 819–824
See application file for complete search history.

(56) References Cited

U.S. PATENT DOCUMENTS

| | | | |
|---|---|---|---|
| 6,256,287 | B1 | 7/2001 | Baartman et al. |
| 6,396,789 | B1 | 5/2002 | Guerra et al. |
| 6,594,086 | B1 | 7/2003 | Pakdaman et al. |
| 6,828,811 | B2 | 12/2004 | Hanson et al. |
| 8,094,389 | B2 | 1/2012 | Terada et al. |
| 9,358,736 | B2 | 6/2016 | Wang et al. |
| 2003/0142418 | A1 | 7/2003 | Hirunuma et al. |
| 2005/0094293 | A1* | 5/2005 | Tanabe ............... G02B 7/14 359/811 |
| 2006/0077788 | A1 | 4/2006 | Shinoda |
| 2006/0182001 | A1 | 8/2006 | Isobe et al. |
| 2007/0014210 | A1* | 1/2007 | Nishioka ............. G11B 7/1376 369/44.32 |
| 2010/0110571 | A1 | 5/2010 | Ono et al. |
| 2010/0246033 | A1 | 9/2010 | Hattori |
| 2012/0063014 | A1 | 3/2012 | Terahara et al. |
| 2012/0092655 | A1 | 4/2012 | Dozor et al. |
| 2012/0113534 | A1* | 5/2012 | Arata ................. G02B 7/16 359/813 |
| 2015/0260976 | A1 | 9/2015 | Frank et al. |
| 2015/0273898 | A1 | 10/2015 | Kataoka et al. |
| 2015/0316741 | A1 | 11/2015 | Kim et al. |
| 2018/0095261 | A1 | 4/2018 | Bae et al. |

FOREIGN PATENT DOCUMENTS

| | | |
|---|---|---|
| CN | 1875307 A | 12/2006 |
| CN | 100380153 C | 4/2008 |
| CN | 101329438 A | 12/2008 |
| CN | 101688963 A | 3/2010 |
| CN | 101713854 A | 5/2010 |
| DE | 3025685 A1 | 6/1981 |
| JP | S38-187907 A | 11/1983 |
| JP | 2006-201407 A | 8/2006 |
| JP | 2007-248872 A | 9/2007 |
| JP | 2010-085715 A | 4/2010 |
| JP | 4495086 B2 | 6/2010 |
| JP | 2011-164007 A | 8/2011 |
| JP | 2013-105115 A | 5/2013 |
| WO | WO-2006/077834 A1 | 7/2006 |
| WO | WO 2008/156037 A1 | 12/2008 |
| WO | WO 2010/140552 A1 | 12/2010 |

OTHER PUBLICATIONS

English-language translation of International Preliminary Report on Patentability (IPRP) dated Apr. 6, 2017 that issued in WO Patent Application No. PCT/JP2015/076881.

* cited by examiner

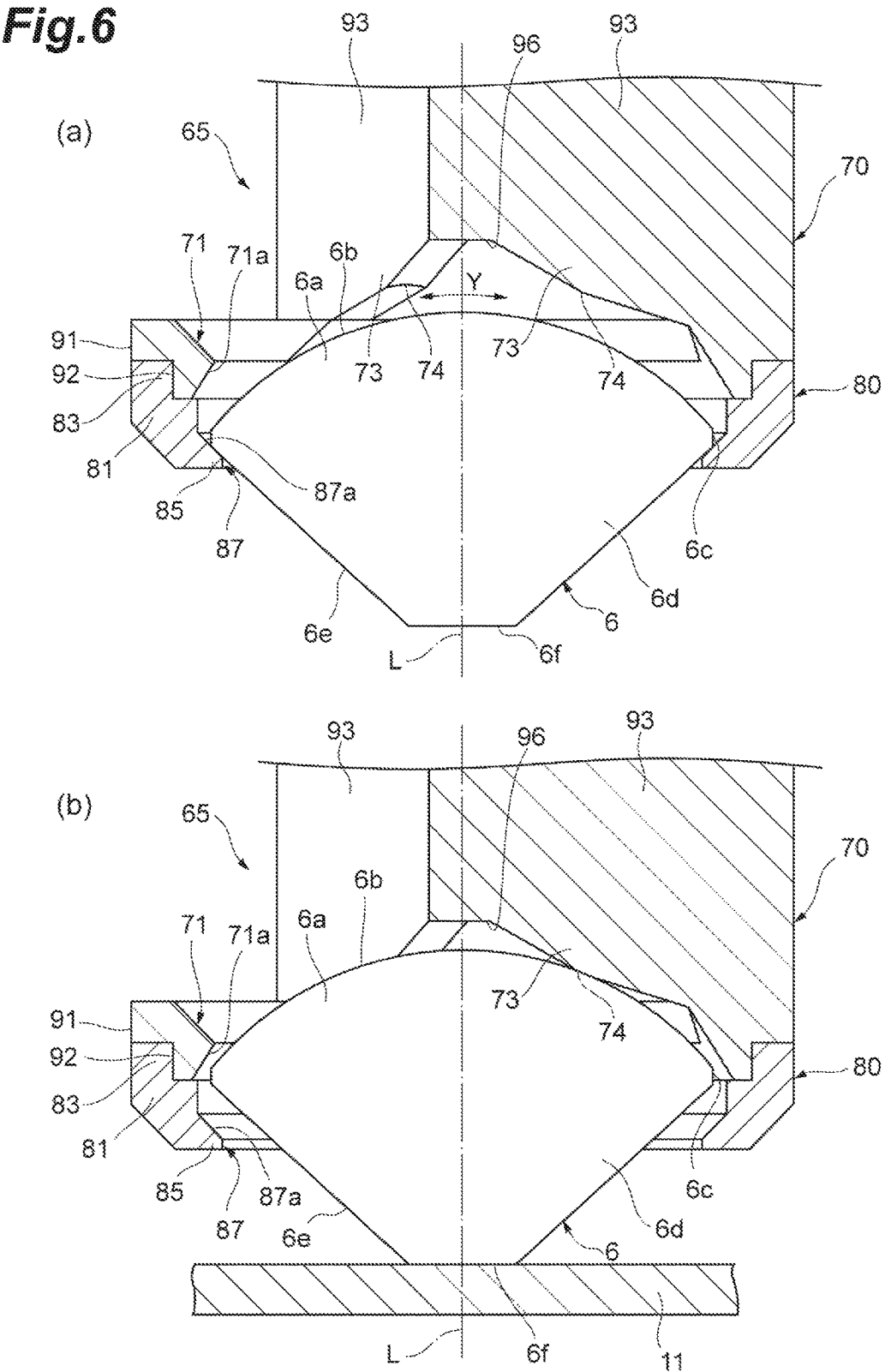

SOLID IMMERSION LENS HOLDER AND IMAGE ACQUISITION DEVICE

TECHNICAL FIELD

An aspect of the present invention relates to a solid immersion lens holder and an image acquisition device including the solid immersion lens holder.

BACKGROUND ART

As a lens for obtaining an enlarged image of an observation object, a solid immersion lens (SIL) is known. The solid immersion lens is, for example, a microscopic lens which is formed in a semispherical shape or a super-semispherical shape called a Weierstrass sphere and has a size of about 1 mm to 5 mm. When the solid immersion lens is installed to contact a surface of an observation object, both a numerical aperture (NA) and a magnification are enlarged and thus an observation can be performed with high spatial resolution.

As a solid immersion lens holder that holds such a solid immersion lens at a front side (an observation object side) of an objective lens, for example, a solid immersion lens holder disclosed in Patent Literature 1 is known. The solid immersion lens holder disclosed in Patent Literature 1 has an accommodation space which is larger than a spherical face portion of the solid immersion lens and holds the solid immersion lens in a swingable manner. Accordingly, in a case where a bottom face (a contact face) of the solid immersion lens contacts the observation object, the solid immersion lens swings inside the solid immersion lens holder so that the contact face follows the observation object so as to closely contacts it. As a result, the solid immersion lens and the observation object can satisfactorily closely contact each other.

CITATION LIST

Patent Literature

Patent Literature 1: Japanese Unexamined Patent Publication No. 2006-201407 A

SUMMARY OF INVENTION

Technical Problem

In the solid immersion lens holder of Patent Literature 1, a contact portion of the solid immersion lens with respect to the spherical face portion is formed as a lens receiving face which has the same curvature as that of the spherical face portion. In this configuration, because the spherical face portion and the lens receiving face come into surface-contact with each other, a contact area is large. For this reason, a swing between the solid immersion lens and the solid immersion lens holder is suppressed by a frictional force acting on the solid immersion lens in a close contact state. As a result, there is a concern that the contact face of the solid immersion lens cannot easily follow the surface of the observation object.

An object of an aspect of the present invention is to provide a solid immersion lens holder enabling a solid immersion lens to easily follow and closely contact an observation object and an image acquisition device including the solid immersion lens holder.

Solution to Problem

According to an aspect of the present invention, there is provided a solid immersion lens holder holding a solid immersion lens at a front side of an objective lens, wherein the solid immersion lens includes a spherical face portion disposed to face the objective lens and a contact portion including a contact face for contacting an observation object, wherein the solid immersion lens holder includes: a first member having a first opening disposing the spherical face portion therein so that a part of the spherical face portion protrudes toward an objective lens side; and a second member having a second opening disposing the contact portion therein so that the contact face protrudes toward a side opposite to the objective lens side, wherein the first member includes three plate portions disposed on the objective lens side with respect to the first opening, and wherein each of the three plate portions is provided with a protrusion portion capable of contacting the spherical face portion.

According to the solid immersion lens holder, because three protrusion portions contact the spherical face portion of the solid immersion lens, a contact area with respect to the solid immersion lens can be decreased. Accordingly, because a frictional force acting on the solid immersion lens when the solid immersion lens swings decreases, the solid immersion lens and the solid immersion lens holder can easily slide on each other. As a result, the solid immersion lens can easily follow and closely contact the observation object.

In the solid immersion lens holder according to an aspect of the present invention, the three protrusion portions may be provided at an interval of 120 degrees in a circumferential direction of the first opening. In this case, in a case where the protrusion portion contacts the spherical face portion, an average force can be applied to the spherical face portion of the solid immersion lens. Accordingly, the solid immersion lens can easily follow and closely contact the observation object.

In the solid immersion lens holder according to the aspect of the present invention, a line passing through a contact position between each of three protrusion portions and the spherical face portion and a curvature center of the spherical face portion may intersect an optical axis of the objective lens in the range of 15 to 65 degrees. In this case, it is possible to ensure a satisfactory slide between the solid immersion lens and the solid immersion lens holder.

In the solid immersion lens holder according to an aspect of the present invention, the three protrusion portions may be configured to come into line-contact with the spherical face portion. In this case, it is possible to further decrease a contact area of the protrusion portion with respect to the solid immersion lens and thus to further easily slide the solid immersion lens and the solid immersion lens holder on each other. Accordingly, the solid immersion lens can further easily follow and closely contact the observation object.

In the solid immersion lens holder according to an aspect of the present invention, a contact position between each of the three protrusion portions and the spherical face portion may be located on a circumference having a center of the first opening as a center. In this case, in a case where the protrusion portion contacts the spherical face portion, an average force can be applied to the spherical face portion of the solid immersion lens. Accordingly, the solid immersion lens can easily follow and closely contact the observation object.

In the solid immersion lens holder according to the aspect of the present invention, three plate portions may be disposed along an optical axis of the objective lens. The three plate portions may be formed along a radial direction of a circle about a center of the first opening. In this case, it is possible to ensure a viewing field of the objective lens.

According to an aspect of the present invention, there is provided an image acquisition device including: a stage holding an observation object; an objective lens disposed to face the observation object on the stage; the above-described solid immersion lens holder holding the solid immersion lens at the front side of the objective lens; an optical detector for detecting light from the observation object through the solid immersion lens and the objective lens and for outputting image data; and an image generating device for generating an image of the observation object based on the image data.

According to the image acquisition device, because the solid immersion lens holder contacts the spherical face portion of the solid immersion lens through three protrusion portions, a contact area with respect to the solid immersion lens can be decreased. Accordingly, because a frictional force acting on the solid immersion lens decreases in a case where the solid immersion lens swings, the solid immersion lens and the solid immersion lens holder can easily slide on each other. As a result, the solid immersion lens can easily follow and closely contact the observation object. For that reason, a sharp image of the observation object can be acquired.

Advantageous Effects of Invention

According to an aspect of the present invention, it is possible to provide a solid immersion lens holder enabling a solid immersion lens to easily follow and closely contact an observation object and an image acquisition device including the solid immersion lens holder.

BRIEF DESCRIPTION OF DRAWINGS

FIG. 6($a$) is a diagram illustrating a state before the solid immersion lens contacts the observation object and FIG. 6($b$) is a diagram illustrating a state where the solid immersion lens contacts the observation object.

DESCRIPTION OF EMBODIMENTS

Figure 1:
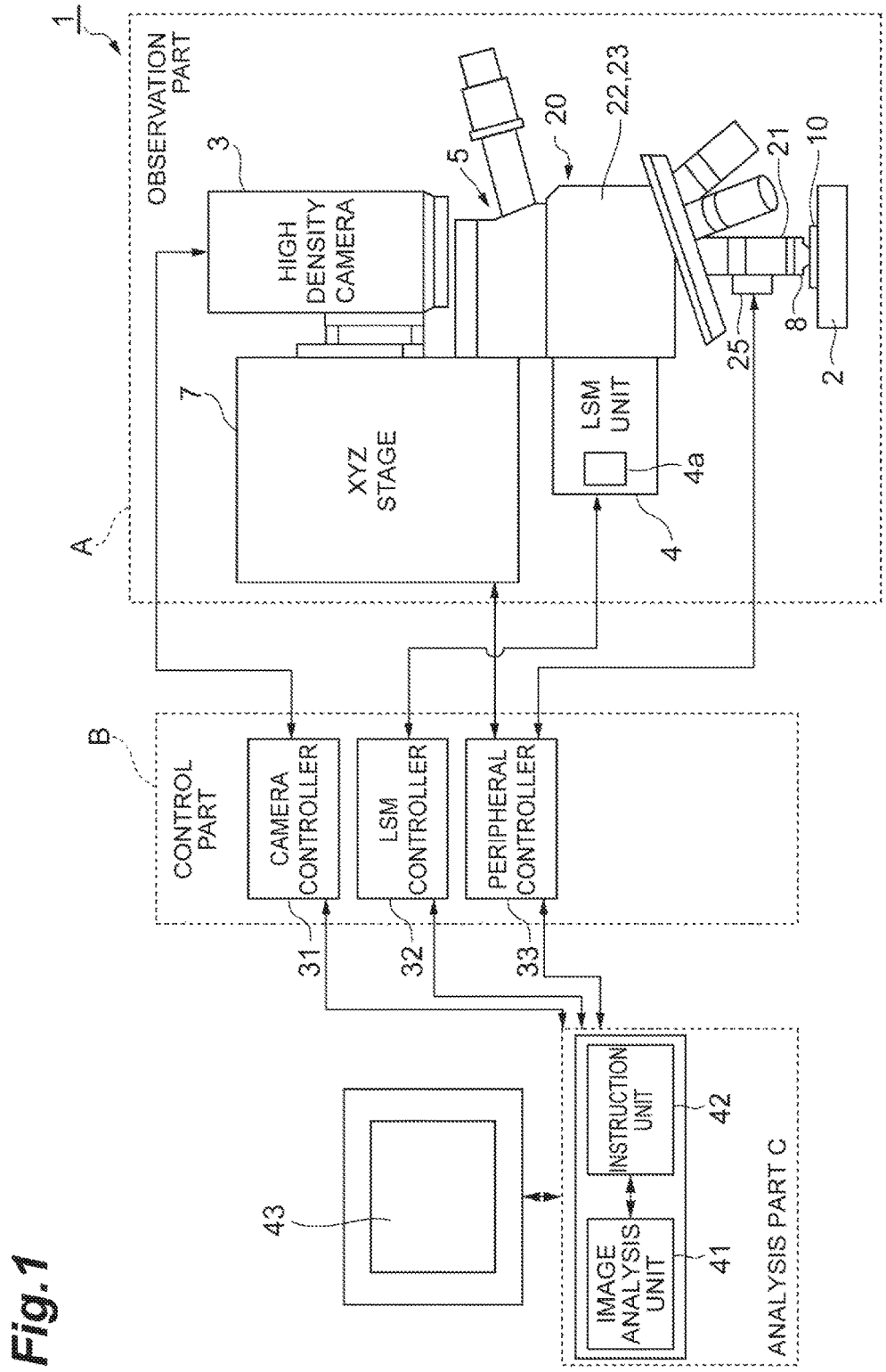
FIG. 1 is a configuration diagram illustrating a semiconductor inspection device including a solid immersion lens holder according to an embodiment.

Hereinafter, preferred embodiments of a solid immersion lens holder according to the present invention will be described with reference to the drawings. Further, in the drawings, the same reference numerals will be given to the same or corresponding components and a repetitive description thereof will be omitted.

Figure 2:
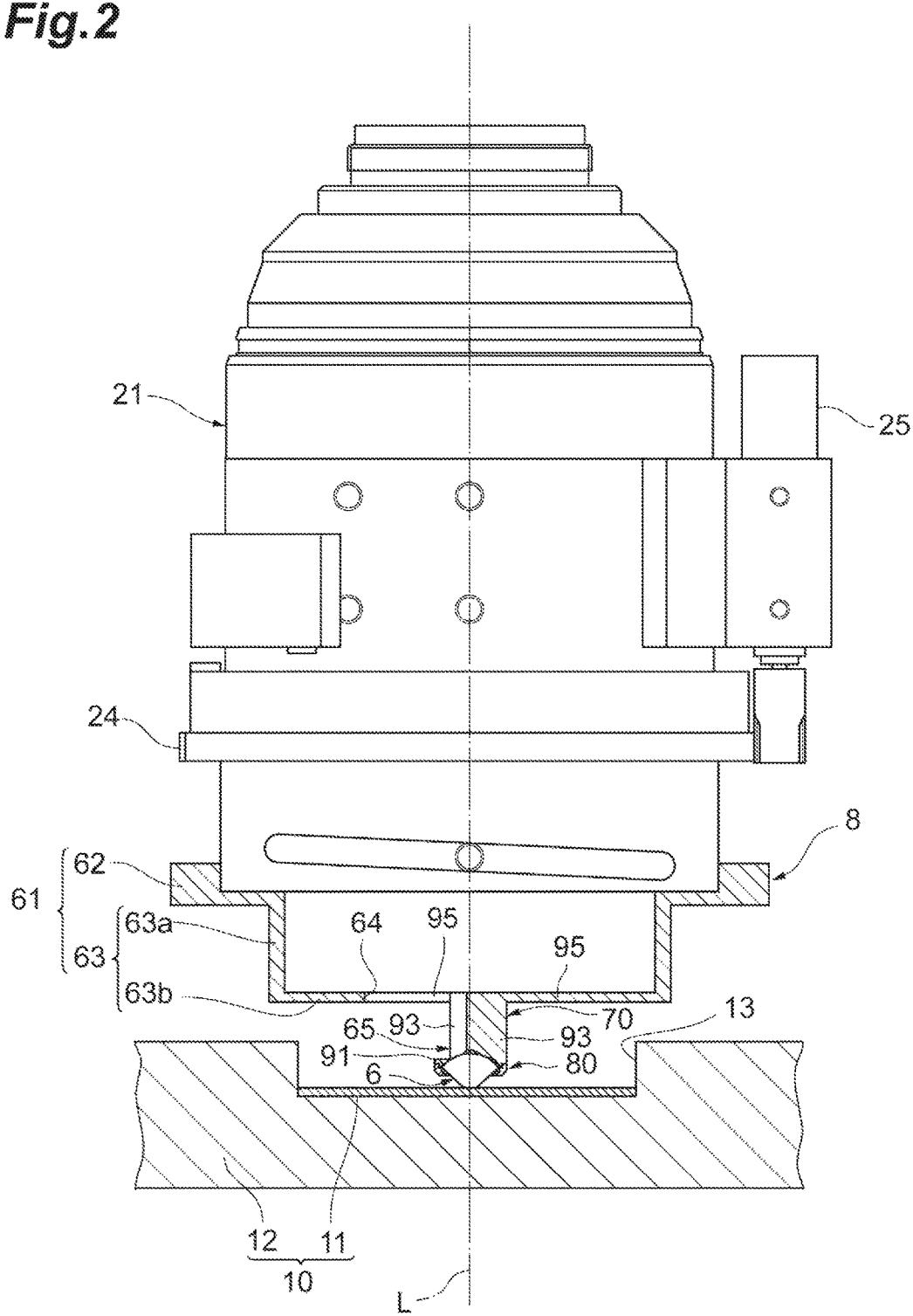
FIG. 2 is a configuration diagram illustrating an objective lens and the solid immersion lens holder.
Figure 3:
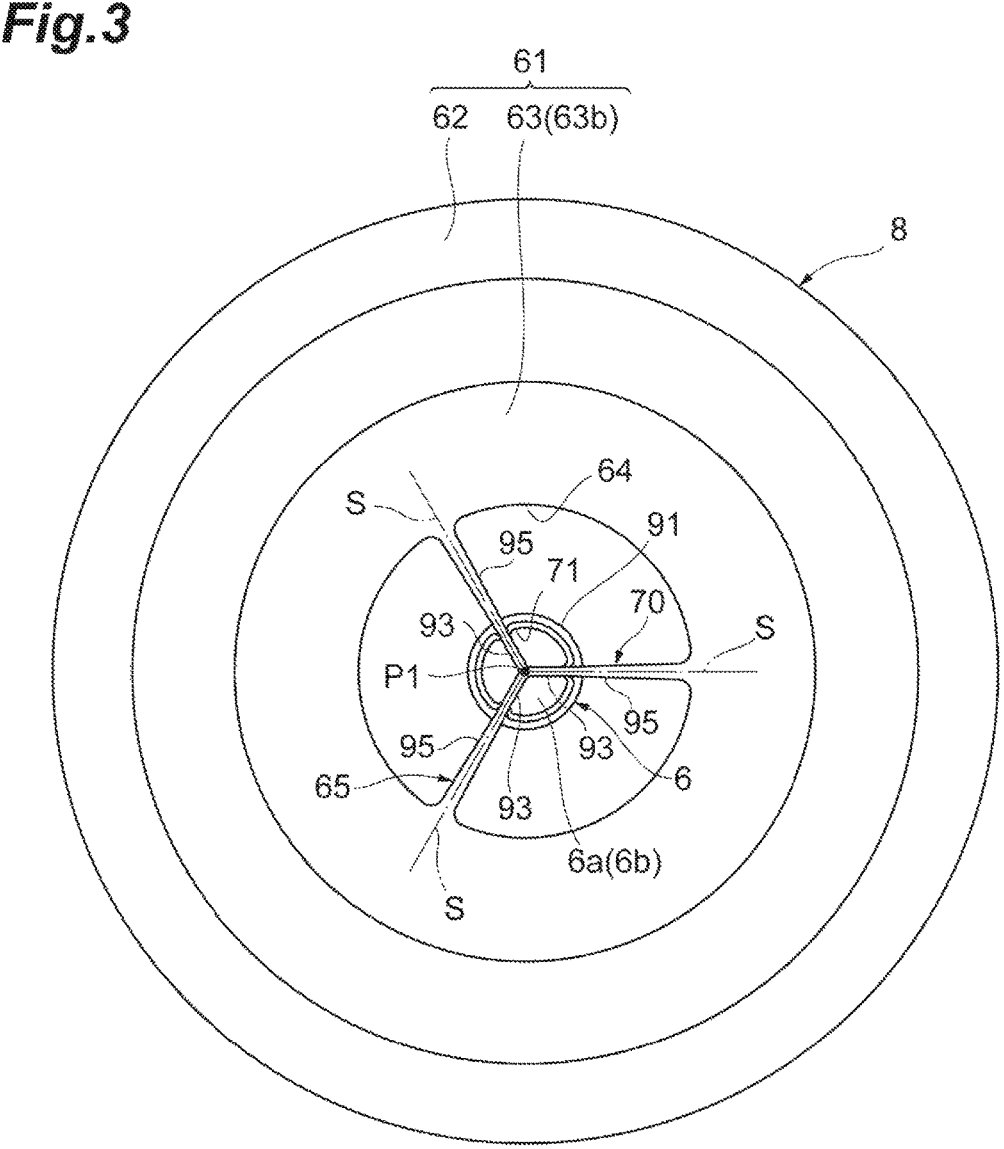
FIG. 3 is a diagram illustrating the solid immersion lens holder when viewed from the objective lens.
Figure 4:
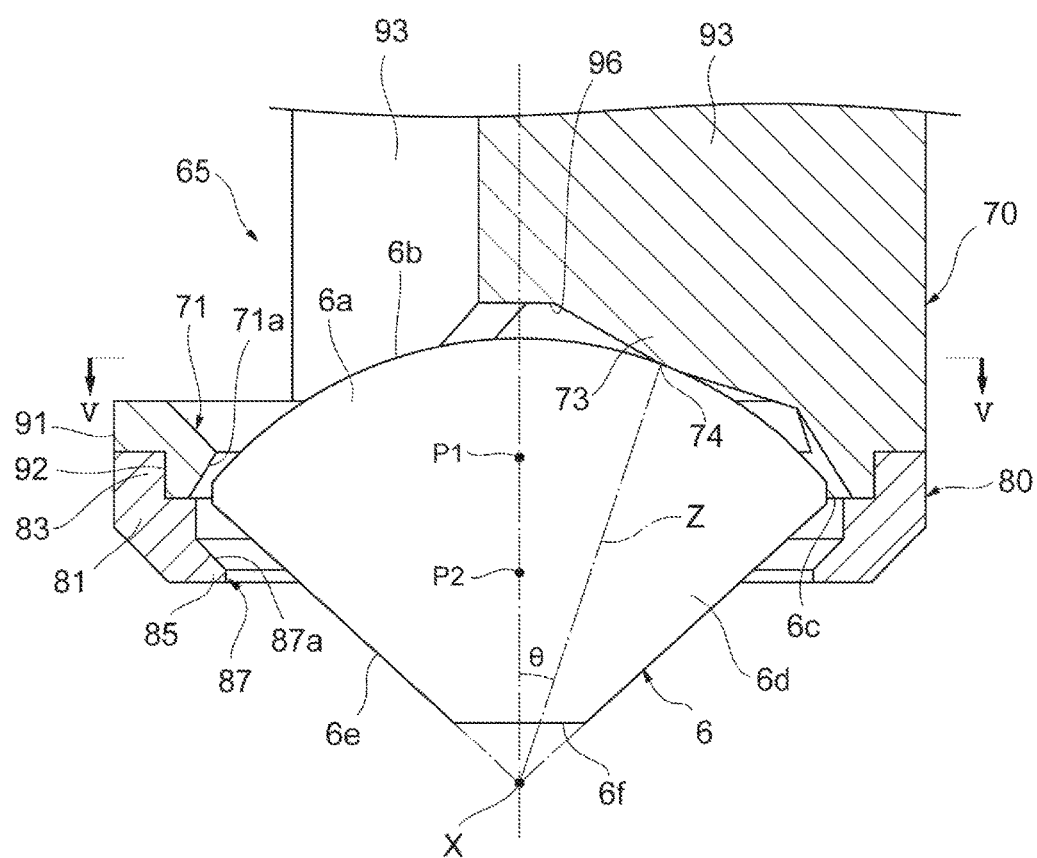
FIG. 4 is an enlarged view of a main part of FIG. 2.
Figure 5:
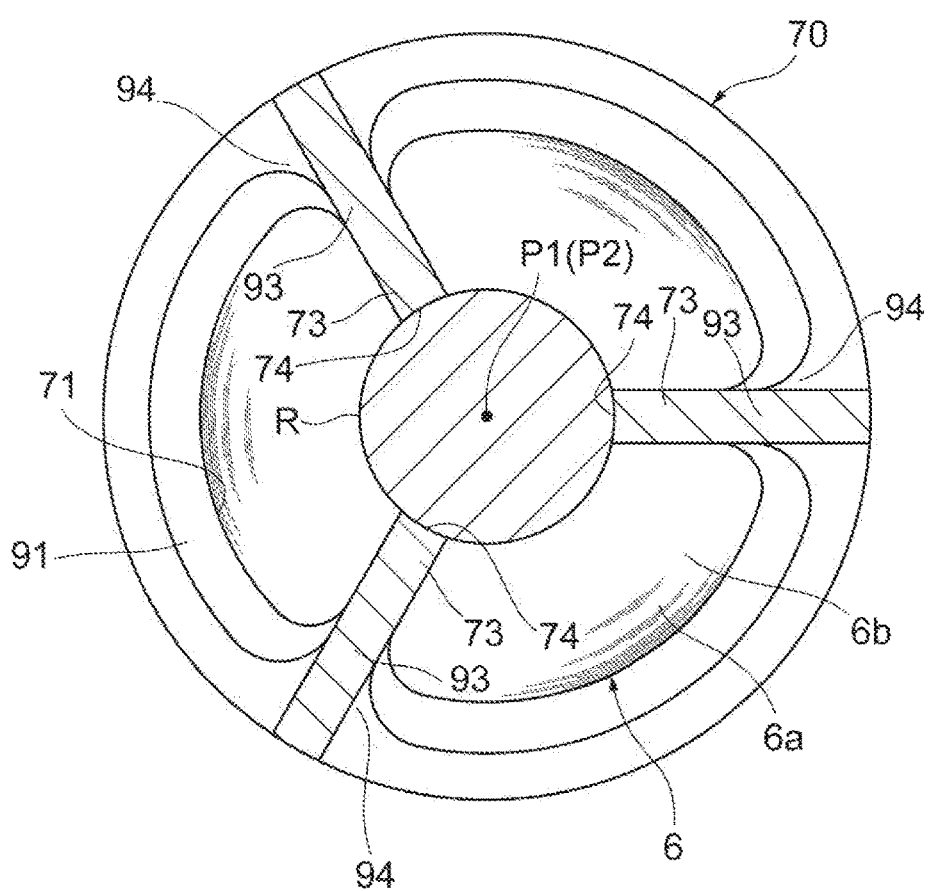
FIG. 5 is a cross-sectional view taken along a line V-V of FIG. 4.

FIG. 1 is a configuration diagram illustrating a semiconductor inspection device (an image acquisition device) including a solid immersion lens holder according to an embodiment. FIG. 2 is a configuration diagram illustrating an objective lens and the solid immersion lens holder. FIG. 3 is a diagram illustrating the solid immersion lens holder when viewed from the objective lens. FIG. 4 is an enlarged view of a main part of FIG. 2. FIG. 5 is a cross-sectional view taken along a line V-V of FIG. 4. FIG. 6($a$) is a diagram illustrating a state before the solid immersion lens contacts the observation object and FIG. 6($b$) is a diagram illustrating a state where the solid immersion lens contacts the observation object. Additionally, FIGS. 1, 2, and 4 illustrate a sample observation state where the solid immersion lens contacts the observation object. In the description below, a description will be made on the assumption that a direction toward the objective lens side with respect to the solid immersion lens is an up direction and a direction toward the observation object side is a down direction.

As illustrated in FIGS. 1 and 2, a semiconductor inspection device (an image acquisition device) 1 is, for example, an inspection device which acquires an image of a semiconductor device 11 and inspects the internal information thereof by setting the semiconductor device 11 (see FIG. 2) that belongs to a mold type semiconductor device and serves as a sample 10 as an observation object.

The "mold type semiconductor device" is a device in which the semiconductor device 11 is molded by resin 12. Further, the "internal information" includes a circuit pattern of the semiconductor device or faint light from the semiconductor device. As the faint light, light which is emitted from an abnormal position based on a defect of the semiconductor device or transient light which is emitted by a switching operation of a transistor in the semiconductor device is exemplified. Further, the "internal information" also includes heat based on a defect of the semiconductor device.

In the sample 10, the resin 12 is cut so that a rear face of the semiconductor device 11 buried inside the resin 12 is exposed. The sample 10 is held by a stage 2 while the semiconductor device 11 is placed on the stage 2 installed at an observation part A so that a rear face of the semiconductor device is directed upward. In this way, because a part of the sample 10 is cut so that the rear face of the semiconductor device 11 is exposed, the semiconductor device 11 is located at a bottom face of a concave portion 13 in which the resin 12 is cut. Then, in the embodiment, the semiconductor inspection device 1 inspects a lower face (in the drawing) of the semiconductor device 11 (an integrated circuit or the like formed on a substrate surface of the semiconductor device 11).

The semiconductor inspection device 1 includes the observation part A which observes the semiconductor device 11, a control part B which controls the operations of components of the observation part A, and an analysis part C which performs processes and instructions necessary for the inspection of the semiconductor device 11.

The observation part A includes a high-sensitive camera 3 and a laser scanning microscope (LSM) unit 4 which serve as an image acquisition unit for acquiring an image from the semiconductor device 11, an optical system 20 which includes an objective lens 21 of a microscope 5, a solid immersion lens 6 (see FIG. 2) which obtains an enlarged observation image of the semiconductor device 11, and an X-Y-Z stage 7 which moves these components in the orthogonal X-Y-Z directions. The objective lens 21 is disposed between the semiconductor device 11 and the high-sensitive camera 3 and the LSM unit 4 and is disposed to face the semiconductor device 11.

The optical system 20 includes a camera optical system 22 and an LSM unit optical system 23 in addition to the objective lens 21. As the objective lens 21, a plurality of objective lenses having different magnifications are provided to be switched. Further, the objective lens 21 includes a correction collar 24 (see FIG. 2) and can be reliably focused to a position which needs to be observed in accordance with the adjustment of the correction collar 24. The camera optical system 22 guides a light which has passed through the solid immersion lens 6 and the objective lens 21 from the semiconductor device 11 toward the high-sensitive camera 3 (the optical detector). The high-sensitive camera 3 outputs image data for generating an image of a circuit pattern of the semiconductor device 11. A CCD area image sensor or a CMOS area image sensor is mounted on the high-sensitive camera 3. Further, the high-sensitive camera 3 may be configured as an InGaAs camera, an InSb camera, a MCT camera, or the like.

Meanwhile, the LSM unit optical system 23 reflects an infrared laser light emitted from the LSM unit 4 toward the objective lens 21 side by a light splitter (not illustrated) so that the infrared laser light is guided to the semiconductor device 11. The LSM unit optical system 23 guides the reflection laser light, emitted from the semiconductor device 11 and advancing toward the high-sensitive camera 3 through the solid immersion lens 6 and the objective lens 21, toward the LSM unit 4.

The LSM unit 4 emits an infrared laser light toward the semiconductor device 11 side while scanning the semiconductor device in the X-Y directions and detects a reflection light from the semiconductor device 11 by an optical detector 4a such as an avalanche photodiode, a photodiode, a photomultiplier tube, and a superconducting single photon detector. The intensity of the detected light is the intensity reflecting the circuit pattern of the semiconductor device 11. Thus, the optical detector 4a of the LSM unit 4 scans the semiconductor device 11 by the infrared laser light in the X-Y directions through the LSM unit 4 and outputs image data for generating an image of the circuit pattern of the semiconductor device 11.

The X-Y-Z stage 7 is a movable stage which moves the high-sensitive camera 3, the LSM unit 4, the optical system 20, and the solid immersion lens 6 in the X-Y directions (a horizontal direction: a direction which is parallel to the semiconductor device 11 serving as an observation object) and a Z direction (a vertical direction) orthogonal thereto if necessary.

The control part B includes a camera controller 31, a laser scan (LSM) controller 32, and a peripheral controller 33. The camera controller 31 is electrically connected to the high-sensitive camera 3. The LSM controller 32 is electrically connected to the LSM unit 4. The camera controller 31 and the LSM controller 32 are configured to control the operations of the high-sensitive camera 3 and the LSM unit 4 so that the semiconductor device 11 is observed by the observation part A (in order to acquire an image) or an observation condition is set.

The peripheral controller 33 is electrically connected to the X-Y-Z stage 7 and the LSM unit 4. The peripheral controller 33 is configured to control the operation of the X-Y-Z stage 7 so that the high-sensitive camera 3, the LSM unit 4, and the optical system 20 is moved, position, and focused to a position corresponding to an observation position of the semiconductor device 11. Further, the peripheral controller 33 drives a correction collar adjustment motor 25 attached to the objective lens 21 to adjust the correction collar 24.

The analysis part C includes an image analysis unit 41 and an instruction unit 42 and is configured as a computer including a processor. The analysis part C is electrically connected to the camera controller 31, the LSM controller 32, and the peripheral controller 33. The image analysis unit 41 generates an image based on image information (image data) output from the camera controller 31 and the LSM controller 32 and performs a necessary analysis process by the processor. The instruction unit 42 refers to the analysis content obtained by the image analysis unit 41 or the input content from an operator by the processor and generates a necessary instruction related to an inspection of the semiconductor device 11 in the observation part A through the control part B. Further, image and data which are acquired and analyzed by the analysis part C are displayed on a display device 43 connected to the analysis part C if necessary. The analysis part C constitutes an image generating device.

As illustrated in FIGS. 2 to 4, the solid immersion lens 6 is a microscopic lens having a semispherical shape and is held at a position below (at the front side of) the objective lens 21 by the solid immersion lens holder 8. That is, the solid immersion lens holder 8 holds the solid immersion lens 6 so that the solid immersion lens 6 is disposed on an optical axis L of the objective lens 21. As illustrated in FIG. 4, the solid immersion lens 6 includes a spherical face portion (a spherical face) 6a which is disposed to face the objective lens 21 and a contact portion 6d which contacts the semiconductor device 11. The solid immersion lens 6 is disposed on the optical axis L of the objective lens 21 so that the contact portion 6d contacts the semiconductor device 11 (the solid immersion lens is placed on the semiconductor device 11).

A spherical face portion 6a is formed in a semispherical shape and forms an upper portion of the solid immersion lens 6. The spherical face portion 6a includes a spherical upper face 6b which serves as a light input and output face with respect to the objective lens 21 and a circumferential face 6c which is continuous to the edge of the upper face 6b. The contact portion 6d is formed to be recessed toward a side opposite to the upper face 6b side from a bottom face of the spherical face portion 6a and forms a lower portion of the solid immersion lens 6. The contact portion 6d includes an inclined face 6e which is continuous to the circumferential face 6c and a plane contact face 6f which is continuous to the inclined face 6e and extends in a direction perpendicular to the thickness direction of the solid immersion lens 6 (a vertical direction in FIG. 4). As illustrated in FIG. 4, an intersection point of a line extended from the inclined face 6e matches a spherical center X of the solid immersion lens 6 (a curvature center of the spherical face portion 6a) in the side view. During the observation of the semiconductor device 11, the contact face 6f contacts an observation position (an upper face in the drawing) of the semiconductor device 11. Additionally, the contact face 6f is not limited to a plane shape.

Specifically; the solid immersion lens 6 is formed of a high refractive index material which is substantially equal or similar to a substrate material of the semiconductor device 11. As a representative example of the high refractive index material, Si, GaP, GaAs, and the like can be exemplified. When the solid immersion lens 6 closely contacts the substrate surface of the semiconductor device 11, the semiconductor device 11 itself is used as a part of the solid immersion lens 6. According to a rear face analysis of the semiconductor device 11 using the solid immersion lens 6, when a focus of the objective lens 21 is aligned to an integrated circuit formed on the substrate surface of the semiconductor device 11, a light flux having a high numerical aperture (NA) can pass though the semiconductor device 11 due to the effect of the solid immersion lens 6 and thus a high resolution can be expected.

A lens shape of the solid immersion lens 6 is determined on the condition that an aberration does not exist. In the semispherical solid immersion lens 6, the spherical center (the curvature center of the spherical face portion 6a) X serves as a focus. In this case, both the numerical aperture (NA) and the magnification are n times. Additionally, a shape of the solid immersion lens 6 is not limited to a semispherical shape. For example, a Weierstrass shape may be used.

The solid immersion lens holder 8 which is a feature of the embodiment appropriately holds such a solid immersion lens 6 at a position below (before) the objective lens 21. The solid immersion lens holder 8 is formed of, for example, metal such as aluminum. As illustrated in FIGS. 2 and 3, the solid immersion lens holder 8 includes a cylindrical main body 61 which is attached to a lower end of the objective lens 21 and a lens holding portion 65 which is provided at the semiconductor device 11 side (a side opposite to the objective lens 21) of the main body 61 and holds the solid immersion lens 6.

Inside the main body 61, the light output from the LSM unit 4 travels toward the solid immersion lens 6 side and the light reflected by the semiconductor device 11 and output from the solid immersion lens 6 travels toward the objective lens 21 side. The main body 61 includes a cylindrical circumferential wall portion 62 which is inserted into the lower end of the objective lens 21 from the outside to be screwed. When the circumferential wall portion 62 is screwed to the lower end of the objective lens 21, the center of the solid immersion lens holder 8 is positioned onto the optical axis L of the objective lens 21. A position of the solid immersion lens 6 which is held by the solid immersion lens holder 8 is adjusted by the driving of the X-Y-Z stage 7.

The main body 61 includes an extension wall portion 63 which extends between the circumferential wall portion 62 and the lens holding portion 65. The extension wall portion 63 is formed to be located at the outside of the lens holding portion 65 in the radial direction in any position thereof. The extension wall portion 63 includes a first wall portion 63a which has a cylindrical shape and extends in parallel to the optical axis L of the objective lens 21 to be continuous to the circumferential wall portion 62 and a second wall portion 63b which has a circular flat plate shape and extends toward the center side of the main body 61 to be continuous to the first wall portion 63a and to be orthogonal to the first wall portion 63a. The center portion of the second wall portion 63b is provided with a circular opening 64 of which a center is located on the optical axis L of the objective lens 21. The lens holding portion 65 is continuous to an inner face of the opening 64.

As illustrated in FIGS. 2 to 5, the lens holding portion 65 includes a first member 70 which is integrally formed with the main body 61 and a second member 80 which has a cylindrical shape and is attached to the semiconductor device 11 side of the first member 70. The first member 70 includes a ring portion 91, three plate members (plate portions) 93 which are continuous to the ring portion 91, and a connection portion 95 which connects the three plate members 93 to the main body 61.

The ring portion 91 is formed in a ring shape which has the optical axis L of the objective lens 21 as a center. The inside of the ring portion 91 is provided with a first opening 71 which has a circular shape and of which a center P1 is located on the optical axis L of the objective lens 21. An inner diameter of the first opening 71 is smaller than an inner diameter of the opening 64. As illustrated in FIG. 4, the inner face of the first opening 71 includes a tapered inclined face 71a which is inclined toward the center P1 as it goes toward the objective lens 21 side (see FIG. 2). An end on the semiconductor device 11 side (see FIG. 2) of the ring portion 91 is provided with a concave portion 92 in which a convex portion 83 of the second member 80 is disposed. The concave portion 92 is formed in an annular shape which has the optical axis L of the objective lens 21 as a center and a rectangular cross-section orthogonal to the circumferential direction thereof. The concave portion 92 is opened to an outer circumferential face and a face on the semiconductor device 11 side of the ring portion 91.

Three plate members 93 are disposed on the objective lens 21 side with respect to the first opening 71. As illustrated in FIG. 2, each of three plate members 93 is formed in a substantially rectangular plate shape. As illustrated in FIGS. 2 and 3, three plate members 93 is disposed along the optical axis L of the objective lens 21. As illustrated in FIG. 3, three plate members 93 have the following configuration when viewed from the objective lens 21 side. That is, each of three plate members 93 is formed along a radial direction of a circle which has the center P1 (a center of the opening 64) of the first opening 71 as a center. A center line S of each of three plate members 93 passes through the center P1. Three plate members 93 are disposed at the same interval (an interval of 120 degrees) in the circumferential direction of the first opening 71.

Three plate members 93 are connected to one another on the center P1 side so as to be integrated with one another. Accordingly, the deflection of the plate member 93 can be suppressed. Three plate members 93 are integrated with the ring portion 91 and are continuous to the ring portion 91 on the semiconductor device 11 side. As illustrated in FIG. 5, in the embodiment, an outer face of a connection portion 94 between each of three plate members 93 and the ring portion 91 is curved to be smoothly continuous without a corner portion. Accordingly, because the plate member 93 and the ring portion 91 are stably connected to each other, the deflection of the plate member 93 can be suppressed.

As illustrated in FIGS. 2 and 3, the connection portion 95 extends in a plate shape in the radial direction of the opening 64. As illustrated in FIG. 3, a width of the connection portion 95 in the circumferential direction of the opening 64 continuously decreases as it goes toward the center P1 side.

As illustrated in FIGS. 4 and 5, each of three plate members 93 is provided with a protrusion portion 73 which protrudes toward the semiconductor device 11 side (toward the curvature center X side of the spherical face portion 6a). The protrusion portion 73 is capable of contacting the spherical face portion 6a of the solid immersion lens 6. As illustrated in FIG. 4, three protrusion portions 73 protrude in a mountain shape. Three protrusion portions 73 are provided at a bottom face 96 which is located on the objective lens 21 side with respect to the ring portion 91 in the plate member 93. The bottom face 96 is orthogonal to the optical axis L of the objective lens 21 and is separated from the upper face 6b of the spherical face portion 6a.

As illustrated in FIG. 5, three protrusion portions 73 have the following configuration in a cross-section which passes through the contact position with respect to the spherical face portion 6a of the solid immersion lens 6 and is orthogonal to the optical axis L of the objective lens 21. That is, three protrusion portions 73 are provided at the inside of the first opening 71 to face the spherical face portion 6a. Three protrusion portions 73 are provided at the same interval (an interval of 120 degrees) in the circumferential direction of the first opening 71. Front ends (front edges) 74 of three protrusion portions 73 are curved and are located on the circumference R which has the center P1 as a center. A distance from the front end 74 of each of three protrusion portions 73 to the center P1 is smaller than an outer diameter of the spherical face portion 6a. In the thickness direction of the plate member 93, a thickness of the protrusion portion 73 is equal to or smaller than a thickness of the plate member 93. Accordingly, because the protrusion portion 73 does not protrude from the plate member 93 in the thickness direction of the plate member 93, a viewing field of the objective lens 21 can be ensured. In the embodiment, a thickness of each of three protrusion portions 73 is the same as a thickness of the plate member 93.

As illustrated in FIG. 4, the second member 80 includes a main body 81 which has a cylindrical shape and a bottom face portion 85 which is provided at an end on the semiconductor device 11 side of the main body 81. An inner diameter of the main body 81 is slightly larger than an outer diameter of the spherical face portion 6a of the solid immersion lens 6. An end on the objective lens 21 side of the main body 81 is provided with the convex portion 83 protruding toward the objective lens 21 side. The convex portion 83 is formed in an annular shape which has the optical axis L of the objective lens 21 as a center and a rectangular cross-section orthogonal to the circumferential direction thereof. Because the convex portion 83 is disposed inside the concave portion 92 of the ring portion 91 and comes into contact with an inner face of the concave portion 92, the second member 80 is positioned to the ring portion 91. The convex portion 83 and the concave portion 92 are fixed to each other by, for example, at least one of fixing methods such as adhering, fitting, and engaging. An engaging structure may include, for example, a claw and a hole engaging with the claw. Instead of or together with the fixing method using the fixing member, the second member 80 may be fastened to the ring portion 91 through a fastening member such as a bolt. Additionally, the main body 81 may be provided with a convex portion and the ring portion 91 may be provided with a concave portion.

The bottom face portion 85 is formed in a circular flat plate shape. The center portion of the bottom face portion 85 is provided with a second opening 87 which has a circular shape and of which a center P2 is located on the optical axis L of the objective lens 21. An inner diameter of the second opening 87 is smaller than an outer diameter of the spherical face portion 6a of the solid immersion lens 6. An inner face of the second opening 87 includes a tapered inclined face 87a which is inclined toward the center P2 as it goes toward the semiconductor device 11 side. An inclination angle of the inclined face 87a with respect to the optical axis L of the objective lens 21 matches an inclination angle of the inclined face 6e of the solid immersion lens 6 with respect to the optical axis L of the objective lens 21.

Here, when the solid immersion lens 6 is held by the lens holding portion 65, the spherical face portion 6a is disposed inside the first opening 71 of the first member 70 so that a part of the spherical face portion 6a (the upper face 6b) protrudes toward the objective lens 21 side and the contact portion 6d is disposed inside the second opening 87 of the second member 80 so that the contact face 6f protrudes toward the semiconductor device 11 side. Accordingly, the solid immersion lens 6 is accommodated into an accommodation space formed between the first member 70 and the second member 80. Then, the first member 70 and the second member 80 are fixed to each other by the fixing member or the fastening member described above.

In this state, as described above, because a distance from each of the front ends 74 of three protrusion portions 73 to the center P1 is smaller than an outer diameter of the spherical face portion 6a, the separation of the solid immersion lens 6 toward the objective lens 21 side is regulated by the first member 70. Further, because the radius of the second opening 87 is smaller than the radius of the spherical face portion 6a, the separation of the solid immersion lens 6 toward the semiconductor device 11 side is also regulated by the second member 80.

The accommodation space which is formed by three protrusion portions 73, the main body 81, and the bottom face portion 85 is slightly larger than the spherical face portion 6a of the solid immersion lens 6. Thus, the lens holding portion 65 has a gutter, in other words, a clearance (a gap) with respect to the solid immersion lens 6. As illustrated in FIG. 6(a), the lens holding portion 65 holds the solid immersion lens 6 so that the solid immersion lens is swingable in a direction indicated by an arrow Y in a state before the solid immersion lens 6 contacts the semiconductor device 11. At this time, the solid immersion lens 6 is supported by the second member 80 (the bottom face portion 85) while the inclined face 6e contacts the inclined face 87a. As described above, in the embodiment, the inclination angle of the inclined face 87a matches the inclination angle of the inclined face 6e of the solid immersion lens 6. For that reason, the inclined face 6e follows the inclined face 87a. Accordingly, the solid immersion lens 6 is positioned to the lens holding portion 65 (the plate member 93).

When the contact face 6f is brought into contact with the semiconductor device 11 from this state, the solid immersion lens 6 moves away from the second member 80 so that the spherical face portion 6a contacts three protrusion portions 73 as illustrated in FIG. 6(b). At this time, because the above-described clearance is provided, the solid immersion lens 6 swings or rotates so that the contact face 6f closely contacts the surface of the semiconductor device 11 so as to follow it and thus the solid immersion lens 6 and the semiconductor device 11 can satisfactorily contact each other. For example, even when the semiconductor device 11 is inclined with respect to the optical axis L, the semiconductor device 11 can be observed.

In the embodiment, because the solid immersion lens 6 and the lens holding portion 65 contact each other only at a contact position between each of three protrusion portions 73 and the spherical face portion 6a, a contact area is small. For that reason, a frictional force which is generated when the solid immersion lens 6 swings is small. As a result, because the solid immersion lens 6 and the lens holding portion 65 can easily slide on each other, the solid immersion lens 6 can easily follow and closely contact the semiconductor device 11. Additionally, because an observation position of the solid immersion lens 6 matches the spherical center X even when the solid immersion lens 6 swings in this way, an observation is not influenced.

Referring to FIGS. 4 and 5, a state where the solid immersion lens 6 contacts the semiconductor device 11 will be described. In this state, the contact face 6f is pressed toward the objective lens 21 side so that three protrusion portions 73 contact the spherical face portion 6a (the upper face 6b) of the solid immersion lens 6. Specifically, three protrusion portions 73 come into line-contact with the spherical face portion 6a in the circumferential direction at the front ends 74. As described above, because the front ends 74 of three protrusion portions 73 are located on the circumference R about the center P1, the contact positions of three protrusion portions 73 with respect to the spherical face portion 6a are also located on the circumference R. In the embodiment, an angle θ formed between the line Z passing through the contact position and the curvature center X of the spherical face portion 6a and the optical axis L of the objective lens 21 is 20 degrees.

Next, an example of a method of acquiring an image of the semiconductor device 11 by using the semiconductor inspection device 1 will be described.

First, an observation position of the semiconductor device 11 using the solid immersion lens 6 is specified by the objective lens 21 without the solid immersion lens 6 among the plurality of objective lenses 21 that belongs to the microscope 5. The observation position is specified in such a manner that the instruction unit 42 drives the X-Y-Z stage 7 through the peripheral controller 33.

After the observation position is specified, the observation is performed by the objective lens 21 with the solid immersion lens holder 8. At this time, the instruction unit 42 adjusts the correction collar 24 to an appropriate position by driving the correction collar adjustment motor 25 through the peripheral controller 33 in response to the characteristics of the solid immersion lens 6 (the thickness or the refractive index of the solid immersion lens 6) held by the solid immersion lens holder 8 and the substrate thickness or the substrate material of the semiconductor device 11.

The instruction unit 42 drives the X-Y-Z stage 7 through the peripheral controller 33 in response to the characteristics of the solid immersion lens 6 so that the solid immersion lens 6 is pressed against the semiconductor device 11. At this time, as described above, because the solid immersion lens 6 swings inside the lens holding portion 65 so that the contact face 6f follows and closely contacts the surface of the semiconductor device 11, the solid immersion lens 6 and the semiconductor device 11 can satisfactorily and closely contact each other.

The instruction unit 42 drives the X-Y-Z stage 7 through the peripheral controller 33 to focus the objective lens 21. Then, the instruction unit 42 observes the semiconductor device 11 by using the LSM unit 4 and the high-sensitive camera 3 through the LSM controller 32 and the camera controller 31 while the objective lens 21 is focused.

In this observation, the infrared laser light which is output from the LSM unit 4 is output toward the sample 10 through the objective lens 21. The light which is output from the objective lens 21 passes through the main body 61 so that the light is incident to the solid immersion lens 6 from the upper face 6b of the solid immersion lens 6 and is output toward the semiconductor device 11. Then, the light (the reflected light) which is emitted as the infrared laser light and is reflected from the semiconductor device 11 is incident to the solid immersion lens 6 again and is output from the upper face 6b of the solid immersion lens 6. More specifically, the light reflected from the semiconductor device 11 is output from an inner portion in relation to the first opening 71 in the upper face 6b.

The reflected light which is output from the solid immersion lens 6 passes through the main body 61 and is incident to the objective lens 21. The reflected light which is incident to the objective lens 21 is guided toward the high-sensitive camera 3 by the camera optical system 22. The high-sensitive camera 3 acquires an image of the circuit pattern of the semiconductor device 11.

The operations and the effects of the solid immersion lens holder 8 and the semiconductor inspection device 1 including the solid immersion lens holder 8 will be described.

According to the solid immersion lens holder 8, because three protrusion portions 73 contact the spherical face portion 6a of the solid immersion lens 6, a contact area with respect to the solid immersion lens 6 can be decreased. Accordingly, because a frictional force which acts on the solid immersion lens 6 when the solid immersion lens 6 swings decreases, the solid immersion lens 6 and the solid immersion lens holder 8 can easily slide on each other and thus the solid immersion lens 6 can easily follow and closely contact the semiconductor device 11. As a result, it is possible to obtain a sharp image of the semiconductor device 11 in the semiconductor inspection device 1 including the solid immersion lens holder 8.

In the solid immersion lens holder 8, because three protrusion portions 73 are provided at an interval of 120 degrees in the circumferential direction of the first opening 71, an average force can be applied to the spherical face portion 6a when the protrusion portion 73 contacts the spherical face portion 6a. Accordingly, the solid immersion lens 6 can easily follow and closely contact the semiconductor device 11. Further, in the embodiment, a constant force can be applied to the spherical face portion 6a.

In the solid immersion lens holder 8, the line Z passing through the contact position between each of three protrusion portions 73 and the spherical face portion 6a and the curvature center X of the spherical face portion 6a intersects the optical axis L of the objective lens 21 at 20 degrees. Accordingly, it is possible to ensure a satisfactory slide between the solid immersion lens 6 and the solid immersion lens holder 8.

In the solid immersion lens holder 8, three protrusion portions 73 come into line-contact with the spherical face portion 6a. Accordingly, because the contact area of the protrusion portion 73 with respect to the solid immersion lens 6 can be further decreased, the solid immersion lens 6 and the solid immersion lens holder 8 can more easily slide on each other.

In the solid immersion lens holder 8, the contact position between each of three protrusion portions 73 and the spherical face portion 6a is located on the circumference R which has the center P1 of the first opening 71 as a center. Accordingly, an average force can be applied to the spherical face portion 6a when the protrusion portion 73 contacts the spherical face portion 6a. For that reason, the solid immersion lens 6 can further easily follow and closely contact the semiconductor device 11. Further, in the embodiment, a uniform force can be applied to the spherical face portion 6a.

In the solid immersion lens holder 8, three plate members 93 are disposed along the optical axis L of the objective lens 21 and are formed along a radial direction of a circle about the center P1 of the first opening 71. Accordingly, the viewing field of the objective lens 21 can be ensured.

While the embodiment according to an aspect of the present invention has been described, the present invention is not limited to the above-described embodiment.

In the above-described embodiment, an example has been described in which an angle θ formed between the line Z and the optical axis L is 20 degrees, but this angle may be equal to or larger than 15 degrees and equal to or smaller than 65 degrees. Within this range, a satisfactory slide between the solid immersion lens 6 and the solid immersion lens holder 8 can be ensured. Further, the angle θ formed between the line Z and the optical axis L may be equal to or larger than 15 degrees and equal to or smaller than 30 degrees. As the contact position between the protrusion portion 73 and the spherical face portion 6a becomes closer to the optical axis, the spherical face portion 6a of the solid immersion lens 6 and the protrusion portion 73 of the solid immersion lens holder 8 can easily slide on each other and thus the solid immersion lens 6 can easily follow the semiconductor device 11.

In the above-described embodiment, a configuration has been described in which the lens holding portion 65 including the first member 70 and the second member 80 is attached to the objective lens 21 through the main body 61, but the lens holding portion 65 may be provided. For example, the lens holding portion 65 may be provided in a casing of the objective lens 21 in consideration of a configuration. Further, the solid immersion lens holder 8 may be an arm type (a movable type) solid immersion lens holder in which the solid immersion lens 6 can be disposed on the optical axis L of the objective lens 21.

In the above-described embodiment, an example of a vertical illumination type has been described in which the contact face 6f of the solid immersion lens 6 comes into contact with the semiconductor device 11 serving as the observation object from above, but the present invention may be also applied to an inverted inspection device in which the contact face 6f comes into contact with the observation object from below. In the case of the inverted inspection device, the observation object is observed from below. In the case of the inverted inspection device, three protrusion portions 73 contact the spherical face portion 6a by gravity even in a state before the solid immersion lens 6 comes into contact with the observation object. Even in this case, because the solid immersion lens 6 swings while sliding on three protrusion portions 73 when the solid immersion lens comes into contact with the observation object, the solid immersion lens 6 can closely contact the observation object in a following manner.

In the above-described embodiment, an example has been described in which three protrusion portions 73 come into line-contact with the spherical face portion 6a, but three protrusion portions 73 may come into point-contact with the spherical face portion 6a. In this case, because a contact area of the protrusion portion 73 with respect to the solid immersion lens 6 can be further decreased, the solid immersion lens 6 and the solid immersion lens holder 8 can more easily slide on each other. Further, the ring portion 91 and the plate member 93 may be formed separately.

REFERENCE SIGNS LIST

1: semiconductor inspection device (image acquisition device), 2: stage, 4a: optical detector, 6: solid immersion lens, 6a: spherical face portion, 6d: contact portion, 6f: contact face, 8: solid immersion lens holder, 11: semiconductor device (observation object), 21: objective lens, 70: first member, 71: first opening, 73: protrusion portion, 80: second member, 87: second opening, 93: plate member, L: optical axis, P1: center of first opening, X: curvature center (spherical center)

The invention claimed is:

1. A solid immersion lens holder holding a solid immersion lens at a front side of an objective lens, the solid immersion lens including a spherical face portion disposed to face the objective lens and a contact portion having a contact face configured to contact an observation object, and the solid immersion lens holder comprising:
a first member having a first opening disposing the spherical face portion therein so that a part of the spherical face portion protrudes toward an objective lens side, and three plate portions disposed on the objective lens side with respect to the first opening, each of the three plate portions being provided with a protrusion portion capable of contacting the spherical face portion; and
a second member having a second opening disposing the contact portion therein so that the contact face protrudes toward a side opposite to the objective lens side,
wherein the solid immersion lens swings while sliding on the three protrusion portions, when the solid immersion lens comes into contact with the observation object.

2. The solid immersion lens holder according to claim 1, wherein the three protrusion portions are provided at an interval of 120 degrees in a circumferential direction of the first opening.

3. The solid immersion lens holder according to claim 1, wherein a line passing through a contact position between each of the three protrusion portions and the spherical face portion and a curvature center of the spherical face portion intersects an optical axis of the objective lens in the range of 15 to 65 degrees.

4. The solid immersion lens holder according to claim 1, wherein the three protrusion portions are configured to come into line-contact with the spherical face portion.

5. The solid immersion lens holder according to claim 4, wherein a contact position between each of the three protrusion portions and the spherical face portion is located on a circumference having a center of the first opening as a center.

6. The solid immersion lens holder according to claim 1, wherein the three plate portions are disposed along an optical axis of the objective lens.

7. The solid immersion lens holder according to claim 1, wherein the three plate portions are formed along a radial direction of a circle about a center of the first opening.

8. An image acquisition device comprising:
a stage holding an observation object;
an objective lens disposed to face the observation object on the stage;
the solid immersion lens holder according to claim 1 holding the solid immersion lens at the front side of the objective lens;
an optical detector configured to detect light from the observation object through the solid immersion lens and the objective lens and to output image data; and
an image generating device configured to generate an image of the observation object based on the image data.

* * * * *